2,755,254

PREPARATION OF HALOPHOSPHATE PHOSPHORS

Keith H. Butler, Marblehead, Mass., assignor to Sylvania Electric Products Inc., Salem, Mass., a corporation of Massachusetts No Drawing. Application December 31, 1949, Serial No. 136,426

15 Claims. (Cl. 252—301.4)

This invention relates to the preparation of halophosphate phosphors, and particularly to the preparation of calcium halophosphate phosphors.

An object of the invention is the production of such a phosphor by a continuous process.

Another object is to produce a phosphor of greater brightness and smaller particle size than those of prior methods.

I have found that manganese-activated calcium halophosphate containing any appreciable amount of chloride will turn a pinkish color if fired in an oxidizing atmosphere and will turn a grayish color if fired in a reducing atmosphere. The halophosphate will remain white if fired in a covered crucible, presumably because an atmosphere of antimony trichloride accumulates in the covered crucible. Phosphors fired in this manner require a considerable excess of antimony trioxide in the starting mixture.

I have found the use of such a large excess of antimony to be unnecessary if the trioxide is replaced by a compound in which the antimony has a higher valence, and an inert atmosphere provided during firing. Suitable antimony compounds are the tetroxide, calcium meta-antimonate, calcium pyro-antimonate, manganese meta-antimonate, manganese pyro-antimonate, calcium fluo-antimonate, manganese fluo-antimonate, and antimonic acid.

My invention permits the initial mixture of phosphor components to be moved continuously through a region of high temperature, in which case the inert gas may flow in the opposite direction, serving simultaneously to provide an inert atmosphere and to carry away the volatile products of the firing, such as water vapor, carbon dioxide, antimony trichloride, and the like, to prevent their contamination of the remaining products.

Other objects, features and advantages of the invention will be apparent from the following specification.

In following the invention, I may start with a powdered mixture of secondary calcium phosphate, calcium carbonate, calcium fluoride, calcium chloride, manganous carbonate, and an antimony oxide, as in my copending application Serial No. 25,692, filed May 7, 1948, now Patent No. 2,579,900, preferably substituting ammonium chloride for the calcium carbonate and increasing the calcium carbonate content to provide the proper amount of calcium, as in the copending application Ser. No. 115,551, filed September 13, 1949, now Patent No. 2,544,663, by Fortney and Moran. Where these processes use antimony trioxide, I instead use antimony tetroxide or another of the other suitable compounds mentioned, and where they use covered crucibles, I use open crucibles or containers and provide an inert atmosphere during firing. In addition, I prefer to reduce the quantity of antimony present, for example using the following proportions:

| | Gram-atoms |
|---|---|
| Phosphorus | 3.00 |
| Calcium plus manganese | 4.80 to 4.95 |
| Fluoride plus chloride | 0.90 to 1.10 |
| Manganese | 0.00 to 0.30 |
| Antimony | 0.01 to 0.18 |
| Chloride | 0.00 to 1.10 |

To obtain these preferred compositions, it is necessary to be able to control independently the amounts of manganese and antimony used. One method of accomplishing this, is by the use of manganese pyroantimonate, manganese carbonate and calcium pyroantimonate as raw materials. When the manganese content of the phosphor is below the preferred antimony content, the extra antimony may be added as calcium pyroantimonate. In the opposite case, where the amount of manganese exceeds the preferred antimony content, the extra manganese carbonate may be added as manganous carbonate.

I prefer, however, to achieve the independent control simply by using manganous carbonate and antimony tetroxide as the raw materials introducing, respectively, the manganese and the antimony.

With this preferred composition, excellent phosphors can be made by firing the complete raw material mixture for a period between ¼ and 2 hours at temperatures between 1050° C. and 1200° C., the temperature range being somewhat dependent on the amount of chloride in the mixture. Phosphors high in chloride content require higher temperatures than phosphors high in fluoride. The time and temperature can be varied beyond these limits if desired, although I prefer the ranges given, and temperatures much below 1050° C. are usually undesirable.

The firing of the mixture prepared as above is performed in an atmosphere of gas inert with respect to the materials being fired, a gas such as nitrogen, carbon dioxide, argon, helium, neon, krypton or xenon being satisfactory. The gas used should be quite pure, because the presence of the inert gas or even as little as 1% of an oxidizing gas will cause a pink discoloration of the powder, and the presence of the same amount of a reducing gas, such as carbon monoxide, gives the powder a gray discoloration and causes a very severe reduction of fluorescence.

The firing may be accomplished by moving the starting mixture through a furnace, and flowing the gas around the mixture in the furnace in a direction opposite to the movement of the mixture therethrough. This insures that the products given off by the phosphor mixture are carried back away from the mixture so as not to contaminate the same.

In order to prevent the pink discoloration of the phosphor by oxidation, the mixture has sometimes been fired in a tube with the ends covered by glass wool or in a covered crucible. An excess of antimony and of chloride is necessary for best results with such methods, probably to insure a slow reaction between the chloride ion and the antimony oxide or other antimony compound in the mixture, with evolution of antimony pentachloride or trichloride. The vapor of this antimony chloride displaces the air in the crucible and maintains an atmosphere free of oxygen. But the reaction products given off from the mixture are not carried away and may remain to contaminate the phosphor. Antimony trichloride, for example, appears to act as a flux and to cause growth in particle size if not carried away.

The use of antimony trioxide also leads to an undesirable loss of antimony and chloride at low temperature, if the mixture is rapidly heated. This trioxide melts at 650° C., the molten oxide then flowing through the mixture and reacting with the chloride ions to form antimony trichloride which, being volatile at this temperature, is driven off. The resultant loss of antimony and chlorine necessitates the use of a considerable excess of both those ingredients in the reaction mixture. But if the antimony is introduced in a higher state of oxidation, for example as the tetroxide, there is no opportunity for the reaction producing antimony chloride to occur, the loss of antimony and chlorine is thereby prevented, and the use of so great an excess rendered unnecessary. The loss of chloride and antimony at the low temperatures in the early stages of firing is thus inhibited, and although some is still lost as the temperature rises above 800° C., the loss is not so serious at that later stage of the firing. The inert atmosphere prevents oxidation of the manganese and the consequent pink discoloration, hence excess chlorine is not necessary. Because there is little formation of antimony chloride, the loss of antimony is minimized.

Other examples of antimony compounds in a higher state of oxidation than the trioxide are the meta-antimonates, pyroantimonates, and fluo-antimonates of calcium and manganese which may be introduced as mentioned earlier in the application.

When antimony is introduced as the trioxide, one of the reactions occurring is the oxidation of the trioxide to the tetroxide, by air leaking into the crucible around the edge of the cover. At a later stage in the firing, this antimony tetroxide reacts with the manganous carbonate or its decomposition products, to form one of the two manganous antimonates, and these further react with calcium phosphate or other calcium compounds to form calcium meta antimonate with the metathesis liberating manganese which enters the halo-phosphate lattice. Thus in covered crucible firing, compounds with antimony in a higher state of oxidation are normally formed in the course of firing and these then react with the chloride ion to liberate antimony penta-chloride.

The formation in the phosphor of residual calcium antimonate is undesirable, since it does not contribute to the fluorescence of the phosphor, is merely an impurity absorbing some of the emitted light and also some of the incident radiation.

The use of antimony in the tetroxide form, with consequent reduction in the amount of antimony initially present, together with the use of an inert atmosphere which prevents oxidation of the manganous compounds to a form suitable for reacting to form calcium meta-antimonate, greatly reduces the amount of the latter compound formed and increases the brightness of the resultant phosphor when excited.

The effectiveness of my invention is shown by the following comparison of results:

The following blend was fired in production-size crucibles of about 5 liters capacity, in the atmosphere of air and products of combustion normally present in a furnace without the inert atmosphere of my invention:

PO$_4$ _____mols__ 3.00
Ca _____gram-atoms__ 4.71
Mn _____do____ 0.13
Sb _____do____ 0.13
F _____do____ 0.81
Cl _____do____ 0.27

The antimony was added as a trioxide, so that the process corresponds to the best used prior to my invention. The other raw materials were calcium carbonate, manganese carbonate, calcium fluoride, ammonium chloride and secondary calcium phosphate (CaHPO$_4$). The minimum firing time to give a relative brightness of 100 was about 4 hours at a temperature of 1975° F. The average particle size was 8 to 9 microns.

A similar mixture using antimony tetroxide instead of antimony trioxide was fired in open trays of 1 by 2 by 3 inch dimensions, by pushing them through a heat zone 36 inches long at 4 minute intervals, giving a 48 minute heating time, with an inert atmosphere of nitrogen flowing oppositely to the direction of motion of the crucibles. The relative brightness in percent of brightness of the other mixture, and the average particle size in microns follows:

| Temperature, ° F. | Brightness | Particle Size |
|---|---|---|
| 1,900 | 102 | 6.4 |
| 1,925 | 105 | 6.8 |
| 1,950 | 106 | 7.2 |
| 1,975 | 107 | 7.2 |

Here particle size is smaller and brightness better than in the other method.

By further way of example, I have made phosphors in the following proportions A, B, C, D, with the antimony used as the tetroxide:

| | A | B | C | D |
|---|---|---|---|---|
| PO$_4$_____mols__ | 3.00 | 3.00 | 3.00 | 3.00 |
| Ca_____gram-atoms__ | 4.70 | 4.70 | 4.70 | 4.70 |
| Mn_____do____ | .10 | .10 | .10 | .10 |
| Sb_____do____ | .10 | .10 | .10 | .10 |
| F_____do____ | .75 | .50 | .25 | .00 |
| Cl_____do____ | .25 | .50 | .75 | 1.00 |

One batch according to each of the above sets of proportions A, B, C, D was fired in an inert atmosphere and another in merely a covered crucible placed in the normal atmosphere of the furnace. The results follow:

*Relative brightness of fluorescence*

| | A | B | C | D |
|---|---|---|---|---|
| Inert atmosphere | 93 | 96 | 94 | 94 |
| Covered crucible | 81 | 85 | 84 | 81 |

*Average particle size in microns*

| | A | B | C | D |
|---|---|---|---|---|
| Inert atmosphere | 4.20 | 3.95 | 3.95 | 4.05 |
| Covered crucible | 4.45 | 4.15 | 4.15 | 4.10 |

Antimony tetroxide was used in both cases, giving generally small particle size, although the smallest size was obtained with the inert atmosphere. In brightness, the inert atmosphere phosphor was much the better.

The firing in both cases was done for half an hour at 1950° F. The inert atmosphere was obtained by placing the batch in an open porcelain container inside a 2-inch diameter silica tube fused at one end and closed by a rubber stopper at the other end. The stopper carried a quarter-inch silica tube extending to within an inch of the porcelain container and carried a vent tube of quarter-inch diameter. Nitrogen was admitted through the silica tube for 10 minutes before the tube was placed in the furnace and continuously while the tube was in the furnace. The closed end and about 18 inches of the tube was inserted into a furnace and held at 1950° F. for half an hour, then removed and cooled for 10 minutes before opening to remove the sample.

What I claim is:

1. The process of preparing a chloride-containing, manganese and antimony activated calcium halophosphate phosphor, said process comprising: mixing together in powdered form some antimony tetroxide in an activating amount and ingredients reactable to form chloride-containing, manganese and antimony activated calcium halophosphate on firing, and firing said mixture in an atmosphere inert with respect to said ingredients.

2. The process of preparing a chloride-containing, manganese and antimony activated calcium halophosphate phosphor, said process comprising: mixing together in powdered form some antimony tetroxide in an activating amount and ingredients reactable to form chloride-containing, manganese and antimony activated calcium halophosphate on firing, and firing said mixture in an atmosphere of nitrogen.

3. The process of preparing a chloride-containing, manganese and antimony activated calcium halophosphate phosphor, said process comprising: mixing together in powdered form some antimony tetroxide in an activating amount and the ingredients necessary to form chloride-containing, manganese and antimony activated calcium halophosphate at high temperature, moving said mixture in one direction through a zone of temperature high enough to effect the formation of said halophosphate, and flowing in the opposite direction through said zone of high temperature a gas inert with respect to said ingredients.

4. The process of preparing a chloride-containing, manganese and antimony activated calcium halophosphate phosphor, said process comprising: mixing together in powdered form some antimony tetroxide in an activating amount and the ingredients necessary to form chloride-containing, manganese and antimony activated calcium halophosphate at high temperature, moving said mixture in one direction through a zone of temperature high enough to effect the formation of said halophosphate, and flowing nitrogen in the opposite direction through said zone of high temperature.

5. The process of claim 1, in which the firing is at a temperature of 1050° to 1200° C.

6. The process of claim 2, in which the firing is at a temperature of 1050° to 1200° C.

7. The process of claim 3, in which the temperature of the high temperature zone is between 1050° C. and 1200° C.

8. The process of claim 4, in which the temperature of the high temperature zone is between 1050° C. and 1200° C.

9. The process of preparing a chloride-containing, manganese and antimony activated calcium halophosphate phosphor, which includes the steps of adding to the other ingredients of the phosphor an activating amount of a compound containing antimony in a higher state of oxidation than in the trioxide and then firing in an atmosphere inert with respect to said ingredients.

10. The process of claim 9, in which the inert atmosphere is nitrogen.

11. The process of preparing a chloride-containing, manganese and antimony activated calcium halophosphate phosphor, which includes the steps of adding in activating amounts to the other ingredients of the phosphor at least one of the compounds in the following group: antimony tetroxide, calcium meta-antimonate, calcium pyro-antimonate, manganese pyro-antimonate, calcium fluo-antimonate, manganese fluo-antimonate, and antimonic acid; and then firing in an atmosphere inert with respect to said ingredients.

12. The process of claim 11, in which the inert atmosphere is nitrogen.

13. The process of claim 9, in which during the firing the ingredients are moved in one direction through a zone of temperature, and the inert atmosphere is passed through the zone in the other direction, to carry away the waste products.

14. The process of claim 11, in which during the firing the ingredients are moved in one direction through a zone of temperature, and the inert atmosphere is passed through the zone in the other direction, to carry away the waste products.

15. The process of preparing a chloride-containing, manganese and antimony activated calcium halophosphate phosphor, said process comprising: mixing together in powdered form some antimony tetroxide and ingredients reactable to form chloride-containing, manganese and antimony activated calcium halophosphate on firing, the antimony in said tetroxide being present in from 0.01 to 0.18 gram-atoms for each gram-molecule of said halophosphate, and firing said mixture in an atmosphere inert with respect to said ingredients.

References Cited in the file of this patent
UNITED STATES PATENTS

| | | |
|---|---|---|
| 2,476,654 | Froehlich | July 19, 1949 |
| 2,488,733 | McKeag et al. | Nov. 22 1949 |